Patented July 21, 1925.

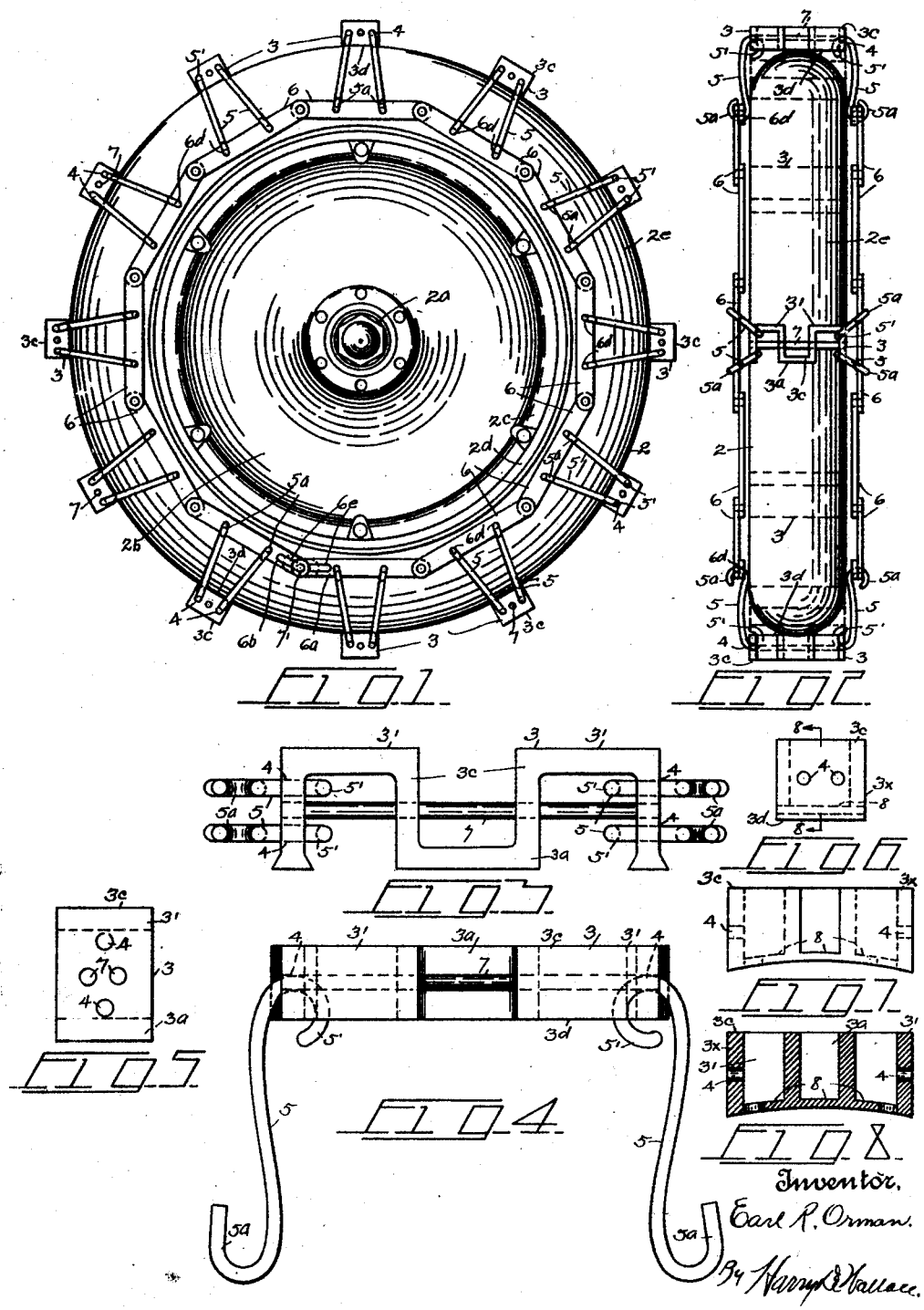

1,546,745

UNITED STATES PATENT OFFICE.

EARL R. ORMAN, OF SYRACUSE, NEW YORK.

NONSKIDDING DEVICE.

Application filed February 16, 1925. Serial No. 9,523.

*To all whom it may concern:*

Be it known that I, EARL R. ORMAN, a citizen of the United States, residing at Syracuse, in the county of Onondaga and State of New York, have invented certain new and useful Improvements in Nonskidding Devices, of which the following is a specification.

This invention relates to improvements in non-skid devices, designed for use in connection with the wheels of automobiles and the like, and has for its object to provide a plurality of similar novel metal shoes or members, which are arranged to be disposed at frequent intervals around the tread, or periphery of the wheel, for preventing skidding, as well as churning of the wheel, on icy roads, or when the wheel encounters soft marshy spots in roadways. A further object is to provide non-skidding members of the class, which are arranged with a plurality of longitudinal as well as transverse relatively narrow edges, that readily bite into the slippery surface of the roadway, and tend to resist slippage of the wheel in every direction. A further object is to provide novel and simple means for supporting the non-skid members on the wheel and for adjusting said supporting means. And a further object is to provide means for reinforcing the individual members, for preventing distortion or breakage when the members are subjected to extraordinary strains.

I attain these objects by the means set forth in the detailed description which follows, and as illustrated by the accompanying drawings, in which—

Figure 1 is a side elevation of an automobile wheel, to which my improvement is applied. Fig. 2 is an edge view of the same, in which certain of the non-skidding members are shown in dotted lines. Fig. 3 is an enlarged top plan view of one of the members. Fig. 4 is a side elevation of the same. Fig. 5 is an enlarged end elevation showing the application of two reinforcing rods. Fig. 6 is a reduced end elevation of a modified form of the device. Fig. 7 is a side elevation of the same, showing the bottom face arched to conform substantially to the curvature of the tire $2^e$. And Fig. 8 is a central vertical longitudinal section, taken on line 8—8 of Fig. 6, showing the bottom face closed.

In the drawing, 2 represents an automobile wheel including, a hub $2^a$, a disc $2^b$, a felly $2^c$, demountable rim $2^d$, and tire $2^e$, all of which may follow any other usual constructions.

My non-skidding device consists of a plurality of similar cast-iron or steel members 3, each comprising a number of staggered or offset angular integral sections, as $3'$—$3^a$, which are arranged to present to the roadway a tortuous relatively narrow face as $3^c$, which readily bites into the roadway, the said face simulating an exaggerated letter M or W. The said device also presents to the tire $2^e$, a similar face $3^d$. When the members 3 are disposed around the tire, the side walls are positioned radially, the end walls of the members are formed with similar perforations 4, for loosely receiving hooks $5'$, of perforated attaching members 5, which are preferably made of stout round wire. The opposite ends of the member 5 are formed with similar hooks $5^a$, which are arranged to engage perforated links 6, the latter being shown riveted together to form circular flexible side members or chains, which are preferably disposed concentric to the tire and rim. Two of the links at each side of the wheel, as $6^a$—$6^b$, are slotted, as at $6^e$, to receive a bolt $7'$, by which the side members may be coupled and adjusted in a suitable manner, to take up slack and to regulate the tension of the parts. The perforations $6^d$ of the links 6 are preferably spaced somewhat wider apart than the perforations 4 of the shoes, so as to provide for suitably spreading the outer ends of the member 5, as shown in Fig. 1. This spreading of the hooks 5 tends to hold the members 3, from shifting out of their regular positions, as well as preventing grouping of the members and thereby exposing relatively large sections of the bare tire to the danger of skidding. The members 3 in Figs. 1 to 4 inclusive are shown reinforced by rods 7, which preferably pass through the four transverse walls of said members. The rods 7 tend to prevent said sections from being spread apart and the whole device distorted, by rocks or other hard objects being forced or wedged between the said section. In the larger sizes of the members 3, two of the rods 7 may be applied, as shown in Fig. 5.

In Figs. 6, 7 and 8 is illustrated a slightly modified non-skidding member 3ˣ, that consists of casting with the walls a bottom web, as 8, which contacts directly with the tire 2ᵉ, and prevents the relatively sharp or narrow faces 3ᵈ, of the sections from cutting the tires. The closed bottom 8 may also be curved, as shown in Fig. 7 to substantially conform to the curvature of the tread of the tire, thus providing a seat for the tire which tends to prevent rocking or canting of the member 3ˣ. The provision of the web 8 renders the use of the rod 7 unnecessary, and it also saves several operations in the production of the members.

Having thus described my invention, what I claim, is—

1. A non-skidding device for vehicle wheels, comprising an elongated metal body having front and rear radial walls and a plurality of integral transverse walls the said walls being arranged to form similar substantially hollow portions whose open sides face forwardly and rearwardly alternately, the linear dimension of said body being disposed transversely across the tread of the wheel, the free faces of said walls being narrow and adapted to bite angularly into the roadway, the end walls of the body being arranged for the application of retaining means, and a reinforcing rod passing through and bracing all of said transverse walls.

2. A non-skidding device for vehicle wheels comprising a metal body having front and rear radial walls and integral end and medial transverse walls, said walls being arranged to form three sides of similar substantially square hollow portions whose open sides face forwardly and rearwardly alternately, the linear dimension of said body being disposed transversely across the tread of the wheel, and the free faces of said walls being relatively narrow and adapted to effect angular depressions in the roadway, for preventing slippage of the wheel in all directions, and the end walls of said body being correspondingly perforated for facilitating the application of retaining means.

In testimony whereof I affix my signature.

EARL R. ORMAN.